(12) United States Patent
Wakiyama

(10) Patent No.: US 7,888,579 B2
(45) Date of Patent: Feb. 15, 2011

(54) ELECTRONIC MUSICAL INSTRUMENT AND PERFORMANCE CONTROL PROGRAM SYSTEMS AND METHODS

(75) Inventor: Mitsuhiro Wakiyama, Hamamatsu (JP)

(73) Assignee: Roland Corporation, Hamamatsu, Shizuoka-ken (JP)

( * ) Notice: Subject to any disclaimer, the term of this patent is extended or adjusted under 35 U.S.C. 154(b) by 491 days.

(21) Appl. No.: 11/941,030

(22) Filed: Nov. 15, 2007

(65) Prior Publication Data

US 2008/0115657 A1 May 22, 2008

(30) Foreign Application Priority Data

Nov. 16, 2006 (JP) .............. 2006-310101

(51) Int. Cl.
*G10H 1/00* (2006.01)
*G10H 1/18* (2006.01)
*A63F 9/24* (2006.01)
*A63F 13/00* (2006.01)
*G06F 17/00* (2006.01)

(52) U.S. Cl. ............... 84/615; 84/614; 463/7; 463/37

(58) Field of Classification Search .................. 84/600, 84/614, 615; 463/7, 37
See application file for complete search history.

(56) References Cited

U.S. PATENT DOCUMENTS

2006/0130641 A1 6/2006 Kurahashi

2006/0252503 A1* 11/2006 Salter .................... 463/25

FOREIGN PATENT DOCUMENTS

| JP | 02-052390 | 2/1990 |
|---|---|---|
| JP | 3-213889 | 9/1991 |
| JP | 03-276182 | 12/1991 |
| JP | 04-029288 | 1/1992 |
| JP | 9-34349 | 2/1997 |
| JP | 2000-20063 | 1/2000 |
| JP | 2002-301262 | 10/2002 |

* cited by examiner

*Primary Examiner*—Elvin G Enad
*Assistant Examiner*—Andrew R Millikin
(74) *Attorney, Agent, or Firm*—Foley & Lardner LLP

(57) ABSTRACT

An electronic musical instrument that includes an input means for inputting first performance data from a first performer side and a second performance data from a second performer side, wherein the input includes at least pitch information, query performance data and response performance data. A mode switch is for switching between a first mode and a second mode. The first mode uses the first performance data as the query performance data, and the second performance data as the response performance data. The second mode uses the second performance data as the query performance data, and the first performance data as the response performance data. A condition determination at least determines whether the response performance data matches the query performance data. A controller automatically operates the mode switch based on the condition determination. The musical instrument enhances learning musical tone discrimination via a game like interaction.

14 Claims, 8 Drawing Sheets

Fig. 2

| Split point | OctShiftL | OctShiftR |
|---|---|---|
| A0-B1 | +36 | 0 |
| C2-B2 | +36 | −12 |
| C3-B3 | +24 | −12 |
| C4-B4 | +12 | −24 |
| C5-B5 | +12 | −24 |
| C6-B6 | 0 | −36 |
| C7-B8 | 0 | −36 |

ELECTRONIC MUSICAL INSTRUMENT AND PERFORMANCE CONTROL PROGRAM SYSTEMS AND METHODS

CROSS-REFERENCE TO RELATED PATENT APPLICATIONS

Japan Priority Application 2006-310101, filed Nov. 16, 2006 including the specification, drawings, claims and abstract, is incorporated herein by reference in its entirety.

BACKGROUND OF THE INVENTION

Field of the Invention

The current disclosure relates generally to electronic musical instrument and performance control programs and systems and methods that employ such programs. Specific embodiments relate to a performance control program, system and method that is effective for training students on tone discrimination and reading music.

Performance training systems typically divide a keyboard into two regions. In those systems, the teacher initially presses a key in one region of the performance operation means. In response to the pressed key, a key in the other region that has a corresponding pitch relationship to the key that has been pressed is designated. This indicates the key that should be operated by the student. Next, the musical tone that corresponds to the operator of the second region with a corresponding pitch is generated. It is also possible to indicate the pitch that corresponds to the operator that the student should operate.

However, the above performance training system may possess limitations. The performance by the teacher always occurs in the first region (for example, the high pitch region) of the keyboard and the student always responds and imitates in the other region (for example, the low pitch region). Because of this repetitive nature, the interest and the desire to learn of the student can decline and thus, the effectiveness of the training may drop.

An electronic musical instrument and a performance control program according to embodiments of the present invention may be configured to address not only the limitations described above, but also to further enhance the learning experience. An instrument as described below may be configured to captivate the interest of the student and, as a result, effective tone discrimination and music reading training can occur.

SUMMARY OF THE DISCLOSURE

A system according to one embodiment of the present invention includes input means with which a first performance data from a first performer side, which has at least pitch information, are input and the second performance data from the second performer side, which has at least pitch information, are input. A mode switching means has a first mode and a second mode. In the first mode, the first performance data from the first performer side that has been input in the input means is used as the query performance data. After the first performance data have been input, the second performance data that has been input from the second performer side are made the response performance data. In the second mode, the second performance data from the second performer side that has been input in the input means is used as the query performance data. After the second performance data has been input, the first performance data that has been input from the first performer side is used as the response performance data. The above embodiment may also include condition determination means, with which when the first mode or the second mode has been set by the mode switching means, based on the query performance data and/or the response performance data that has been input in the input means, a determination is made as to whether or not predefined conditions have been satisfied. A control means is provided to control (switch) the mode that is set by the mode switching means, when a determination has been made by the condition determination means that the conditions have been satisfied.

Accordingly, the musical instrument includes a first mode and a second mode that may be switched by the mode switching means. The first mode uses first performance data that has at least the pitch information input from the first performer side. In the first mode, the first performance data is made the query performance data. If, after the first performance data has been input, second performance data that has at least pitch information has been input from the second performer side, the second performance data is made the response performance data. Further, in a second mode, the second performance data that has been input from the second performer side is used as query performance data, while the first performance data that has been input from the first performer side, after the input of the second performance data, is used as the response data.

In cases in which a first mode or a second mode is set by a mode switching means, a determination can be made by the condition determination means as to whether or not predefined conditions have been satisfied based on the query performance data and/or the response performance data that have been input by the input means. If the determination is made that the conditions have been satisfied, the mode switching means can switch the mode under the control of a control means. The "predefined conditions" can involve, but are not limited to, an evaluation that compares the response performance data that has been input by the input means and the query performance data that has been input before (for example, to determine whether it is a correct response or an incorrect response and if it is not a correct response, the degree of similarity, and the like). Other examples of "predefined conditions" may involve the matching or surpassing of a query count for the query performance data or the response count for the response performance data, the time that has passed from the input of the query performance data, and the like. Furthermore, the predefined conditions may be individual conditions or a combination of a plurality of conditions.

Therefore, with regard to the first performance data that have been input from the first performer side and the second performance data that have been input from the second performer side, whether one or the other becomes the query performance data or becomes the response performance data changes in conformance with whether the electronic musical instrument is in the first mode or the second mode. Switching between the first mode and the second mode is controlled and carried out by the control means in conformance with the determination by the condition determination means.

In this manner, in accordance with the above-discussed embodiment of an electronic musical instrument, one of the first performance data and the second performance data becomes the query and the other becomes the response, and the query and response may be changed appropriately. As a result, there is the advantageous result that since it is possible to conduct the training of tone discrimination and music reading with the feeling of a game to better maintain the interest of the one who is learning. Accordingly, it is possible to study while learning from each other by means of a competitive spirit, such that the training of tone discrimination and music reading can be done effectively.

In a further embodiment of the above-discussed electronic musical instrument, a plurality of performance operators are arranged in a prescribed performance region. In addition, the electronic musical instrument according to this embodiment includes a divided mode designation means that designates a divided mode in which the performance region is divided into a first region and a second region, where the second region is different than the first region. A performance operator in the second region can specify pitch information that is the same as the pitch information that is designated by a performance operator of the first region. A performance data output means outputs performance data to the input means. In particular, when the first region is made the first performer side and a performance operator of that region is operated in the divided mode (in which the performance region is divided into a first region and a second region where it is possible to specify the performance operators in the second region to have the same pitch information as the pitch information that has been specified by the performance operators of said first region), the first performance data are output to the input means by the performance data output means. On the other hand, when the second region is made the second performer side and an operator of that region is operated, the second performance data are output to the input means by the performance data output means.

Therefore, in the electronic musical instrument with which the performance region has been divided into two regions, one of the performers that perform in each of the regions becomes the query side and the other becomes the response side. Since the query side and the response side are changed appropriately, there is the advantageous result that it is possible to conduct the training of tone discrimination and music reading with the feeling of a game to help maintain the interest of the one who is learning. Accordingly, it is possible to study while learning from each other by means of a competitive spirit, and the training of tone discrimination and music reading can be done effectively.

Another embodiment of the electronic musical instrument includes a plurality of performance operators that are arranged in a prescribed performance region. This embodiment also includes a divided mode designation means that designates a divided mode in which the performance region is divided into a first region and a second region. The second region has a performance operator with which it is possible to specify pitch information that is the same as the pitch information that is designated by a performance operator of the first region. A query performance data output means is also included in this embodiment, with which, when in the divided mode, performance data (that includes at least pitch information that is based on the pitch information that can be designated by a performance operator in the first region or the second region) is output as the query performance data. A region identification means is included, with which in those cases where, after the query performance data has been output by the query performance data output means and the performance operator of the first region or the second region has been operated, the region to which the performance operator that has been operated belongs to is identified. Response performance data acquisition means is provided, with which in those cases where the performance operator of the first region or the second region has been operated after the query performance data has been output by the query performance data output means, the performance data that include at least the pitch information that is specified by the performance operator is acquired as the response performance data. A condition determination means is provided, with which a determination is made of whether or not pre-defined conditions have been satisfied. The determination is based on at least one from among the response performance data that has been acquired by the response performance data acquisition means, the query performance data that has been output by the previously mentioned query performance data output means, and the region that has been identified by the previously mentioned region identification means. Reporting means reports the results of the determination, in those cases where a determination has been made by the condition determination means that the conditions have been satisfied.

In accordance with the above embodiment, the divided mode designation means designates the divided mode, in which the performance region is divided into a first region and a second region that is different from the first region, and where the second region has performance operators with which it is possible to specify the same pitch information as the pitch information that has been specified by the performance operators of said first region.

In the divided mode, the performance data that contains at least the pitch information and that can be specified by the performance operators included in the first region and the performance operators included in the second region, are output as the query performance data by the query performance data output means.

When a performance operator of the first region or the second region is operated, an identification is made by the region identification means as to which of either the first region or the second region has been operated.

In addition, when a performance operator of the first region or the second region has been operated, the performance data that contains at least the pitch information that has been designated by that performance operator is acquired as the response performance data by the response performance data acquisition means.

The response performance data is acquired by the response performance data acquisition means. The query performance data can be output by the query performance data output means. A determination is made by the condition determination means, based on at least one of the response performance data, the query performance data, and the regions that have been identified by the region identification means as to whether or not the conditions that are specified in advance have been satisfied. If determination is made that the conditions have been satisfied, then the results of the determination are reported by the reporting means.

Therefore, after the query performance data has been output by the query performance data output means and the question has been queried, reporting is accomplished. The report can include, the region in which the predefined conditions have been satisfied the soonest and the like, and the results of the determination as to whether the other specified conditions have been satisfied. Since the current embodiment allows for competition among all of the responders regarding the speed from when the query is made until the conditions are satisfied, there is the advantageous result that it is possible to conduct the training of tone discrimination and music reading with the feeling of a competition or game. Because it is possible to captivate the interest of those who are learning, while mutually learning from each other by means of a competitive spirit, the training of tone discrimination and music reading can be done effectively.

Another embodiment may include a plurality of performance operators that are arranged in a prescribed performance region, and divided mode designation means that designates a divided mode, with which the performance region is divided into the first region and the second region that is different from the first region. This embodiment also may include region selection means, with which in the divided mode, one of either the first region or the second region is selected. This embodiment may also include, query performance data output means, with which the performance data that includes at least the pitch information that can be designated by the performance operator that is part of the region that has been selected by the region selection means, is output as the query performance data. This embodiment may include, response performance data acquisition means, with which in those cases where, after the query performance data has been output by the query performance data output means and an operator that belongs to the region that is selected by the region selection means has been operated, performance data that includes at least the pitch information that is specified by the operated performance operator is acquired as the response performance data. Condition determination means, with which, based on the response performance data that have been acquired by the response performance data acquisition means and/or the query performance data that have been output by the query performance data output means, a determination is made as to whether or not the predefined conditions have been satisfied. When a determination has been made by the condition determination means that the predefined conditions have been satisfied, the region selection means selects a region that is different from the region that is currently selected.

In accordance with the above embodiment, it is possible to designate a divided mode in which the performance region is divided into the first region and the second region that is different from the first region by the divided mode designation means.

When either one of the first region or the second region is selected by the region selection means in the divided mode, the performance data that include at least the pitch information that can be specified by the performance operators that are in the selected region, are output as the query performance data by the query performance data output means.

When an operator that belongs to the region that is selected by the region selection means is operated after the query performance data has been output by the query performance data output means, the performance data that contain at least the pitch information that is specified by the performance operator that has been operated, is acquired as the response performance data by the response performance data acquisition means.

A determination is made by the condition determination means as to whether or not the predefined conditions have been satisfied based on the response performance data that has been acquired by the response performance data acquisition means and/or the query performance data that have been output by the query performance data output means. When a determination is made that the conditions have been satisfied, the region selection means selects a new region that is different from the region that is currently selected.

Therefore, by means of the region selection means, one of the regions from either the first region or the second region, which was produced by the division of the performance region, is selected as the region for the response. When the relevant region for the response has satisfied the previously set conditions, the other region is selected to proffer the correct response. In accordance with the current embodiment, by alternating the response side in the above manner, there is the advantageous result that it is possible to conduct the training of tone discrimination and music reading with the feeling of a game, and the interest of the one who is learning can be maintained. It is also possible to study while mutually learning from each other by means of a competitive spirit, and the training of tone discrimination and music reading can be done effectively.

In a further embodiment of the present invention, a performance control program for an electronic musical instrument can include an input step in which the first performance data that has at least pitch information is input from a first performer side and a second performance data that has at least pitch information is input from a second performer side. Also included is a mode switching step to switch between a first mode and a second mode. In the first mode, the first performance data from the first performer side that has been input is made the query performance data. Also included is a step that after the first performance data has been input, the second performance data that is input from the second performer side is used as the response performance data. In the second mode, the second performance data from the second performer side is made the query performance data. After the second performance data has been input, the first performance data that has been input from the first performer side is used as the response performance data. After that the response side and query side is switched from the first performer side to the second performer side. A condition determination step is carried out, with which, in those cases where the first mode or the second mode has been set by the mode switching step, based on the query performance data and/or the response performance data, a determination is made as to whether or not predefined conditions have been satisfied. A control step is carried out, with which in those cases where a determination has been made by the condition determination step that the conditions have been satisfied, control is carried out to switch the mode that is set by the mode switching step.

In accordance with the above embodiment of a performance control program, the first performance data that has been input from the first performer side in the input step and the second performance data that has been input from the second performer side in the input step change to become the query performance data or to become the response performance data in conformance with whether the electronic musical instrument is in the first mode or in the second mode. The switching between the first mode and the second mode is controlled and carried out by the control step in conformance with the determination by the condition determination step.

Therefore, one of either the first performer or the second performer becomes the query and the other one is made the response. The query side and the response side change appropriately. As a result, there is the advantageous result that since it is possible to conduct the training of tone discrimination and music reading with the feeling of a game and the interest of the one who is learning can be maintained and, together with this, it is possible to study while mutually learning from each other by means of a competitive spirit and the training of tone discrimination and music reading can be done effectively.

In yet another embodiment of the present invention, a performance control program includes, among other features, a divided mode designation step. The designation step designates a divided mode in which a specified performance region that contains a plurality of performance operators is divided into a first region and a second region that is different from the first region. The designation step may use performance operator of the second region with which it is possible to specify pitch information that is the same as the pitch information that is designated by a performance operator of the first region.

This embodiment can include a query performance data output step, with which, in the divided mode, performance data that includes at least the pitch information that can be designated by a performance operator that is located in the first region and a performance operator that is located in the second region, are output as the query performance data. This embodiment also includes a region identification step with which, after the query performance data has been output by the query performance data output step, and the performance operator of the first region or the second region has been operated, which of either the first region or the second region the operated performance operator belongs to is identified. A response performance data acquisition step can also be used, where after the query performance data has been output by the query performance data output step, and the performance operator of the first region or the second region has been operated, the performance data that includes at least the pitch information that is specified by the performance operator, is acquired as the response performance data. The program includes a condition determination step, with which a determination is made as to whether or not predefined conditions have been satisfied, based on at least one from among the response performance data that has been acquired by the response performance data acquisition step, the query performance data that have been output by the query performance data output step, the region that has been identified by the previously mentioned region identification step. The program includes a reporting step with which, when a determination had been made by the condition determination step that the predefined conditions have been satisfied, the results of the determination are reported.

In addition, in accordance with the performance control program of the above embodiment, after the query performance data has been output by the query performance data output means and the question has been queried, the region in which the conditions that have been specified in advance has been satisfied the soonest and the like, and the results of the determination as to whether the other specified conditions have been satisfied are reported. Since in accordance with the performance control program, there is competition among all of the responders regarding the speed from when the query is made until the conditions are satisfied, there is the advantageous result that it is possible to conduct the training of tone discrimination and music reading with the feeling of a game. Thus, the interest of the one who is learning can be maintained. Accordingly, it is possible to study while mutually learning from each other by means of a competitive spirit, and the training of tone discrimination and music reading can be done effectively.

Examples of the "predefined conditions" described in various embodiments can include: an evaluation in which a comparison of the response performance data that have been input by the input means and the query performance data that have been input before is obtained (for example, whether it is a correct response or an incorrect response and if it is not a correct response, the degree of similarity, and the like), the query count for the query performance data, the response count for the response performance data, and the time that has passed from the input of the query performance data. The predefined conditions may be individual conditions or a combination of a plurality of conditions.

Another embodiment of a performance control program includes a divided mode designation step that designates a divided mode, with which a specified performance region that contains a plurality of performance operators is divided into the first region and the second region, where the second region is different from the first region. The program includes a region selection step, with which in the divided mode, one of either the first region or the second region is selected. This embodiment may include a query performance data output step, with which the performance data that includes at least the pitch information that can be designated as the performance operator that is in the region that has been selected, is output as the query performance data. This embodiment also includes a response performance data acquisition step, with which after the query performance data has been output by the query performance data output step, and an operator that belongs to the region that is selected by the region selection step has been operated, performance data that include at least the pitch information that is specified by the operated performance operator is acquired as the response performance data. This embodiment also includes a condition determination step, with which, based on the response performance data that have been acquired by the response performance data acquisition step and/or the query performance data that have been output by the query performance data output step, a determination is made as to whether or not the predefined conditions have been satisfied. When a determination has been made by the condition determination step that the predefined conditions have been satisfied, a region selection step selects a new region that is different from the region that is currently selected.

In accordance with the above embodiment of the performance control program, with the region selection means, one of the regions from either the first region or the second region is selected as the region for the response. When the relevant region for the response has satisfied the predefined conditions, a change is made to the other region. In accordance with the performance control program, by means of the appropriate alternation of the response side in above manner, there is the advantageous result that it is possible to conduct the training of tone discrimination and music reading with the feeling of a game and the interest of the one who is learning can be maintained. Accordingly, it is possible to study while mutually learning from each other by means of a competitive spirit, and the training of tone discrimination and music reading can be done effectively.

BRIEF DESCRIPTION OF THE DRAWINGS

FIG. 2 is a schematic depiction that shows a configuration of a shift table;

DETAILED DESCRIPTION OF PREFERRED EMBODIMENTS

Figure 1:
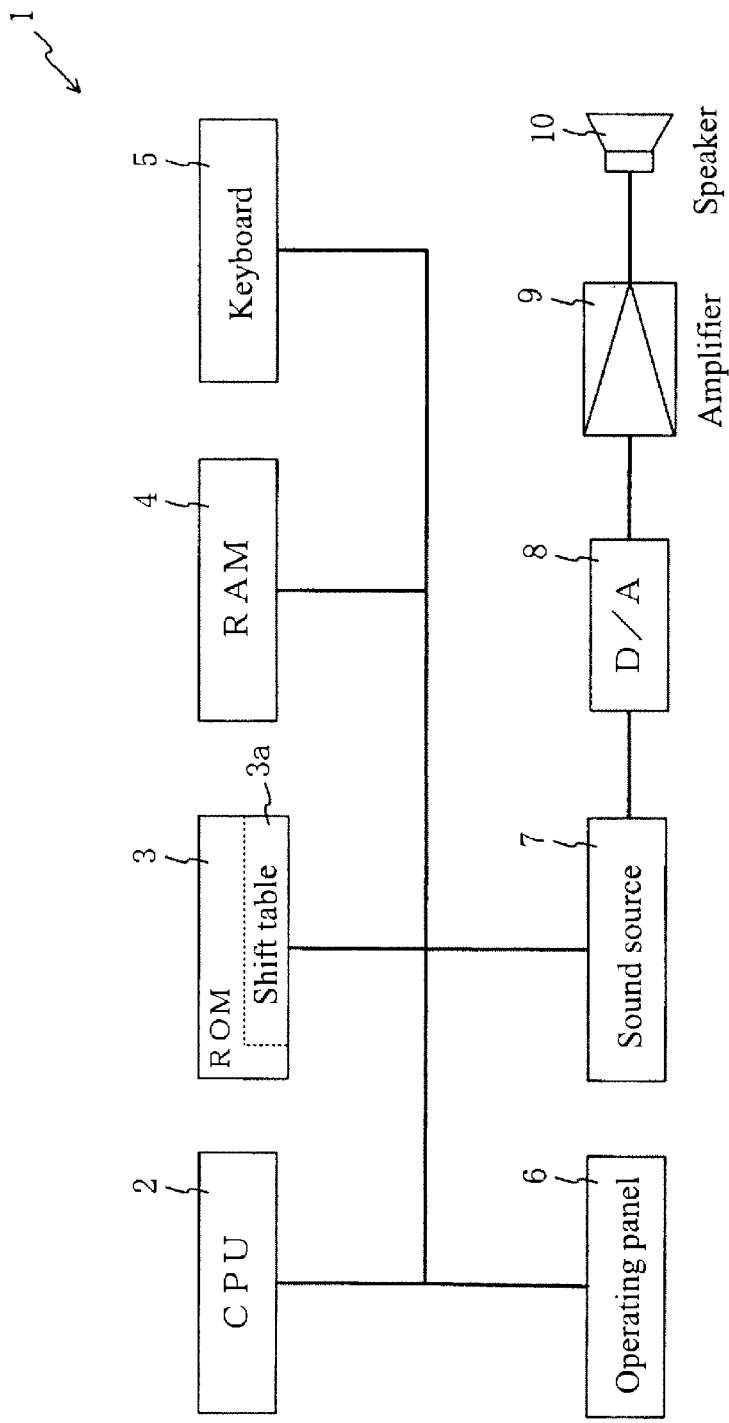
FIG. 1 is a block diagram that shows a configuration of the electronic musical instrument of a first embodiment of the present invention.

An explanation will be given below regarding preferred embodiments, while referring to the attached drawings. FIG. 1 depicts a block diagram representing a configuration of an electronic musical instrument 1 of a first embodiment.

As is shown in FIG. 1, the electronic musical instrument 1 includes a CPU 2, a ROM 3, a RAM 4, a keyboard 5, an operating panel 6, and a sound source 7 that are electrically connected together. The output of the sound source 7 can be connected to the D/A converter 8, the output of the D/A converter 8 can be connected to the amplifier 9, and the amplifier 9 can be connected to the speaker 10.

The CPU 2 is an arithmetic processing unit that controls the electronic musical instrument 1. The ROM 3 stores various types of control programs that can be executed by the CPU 2 and the fixed value data that are referred to at the time of the execution. A shift table 3a, which will be discussed later while referring to FIG. 2, is stored as fixed value data in the ROM 3.

Figure 6:
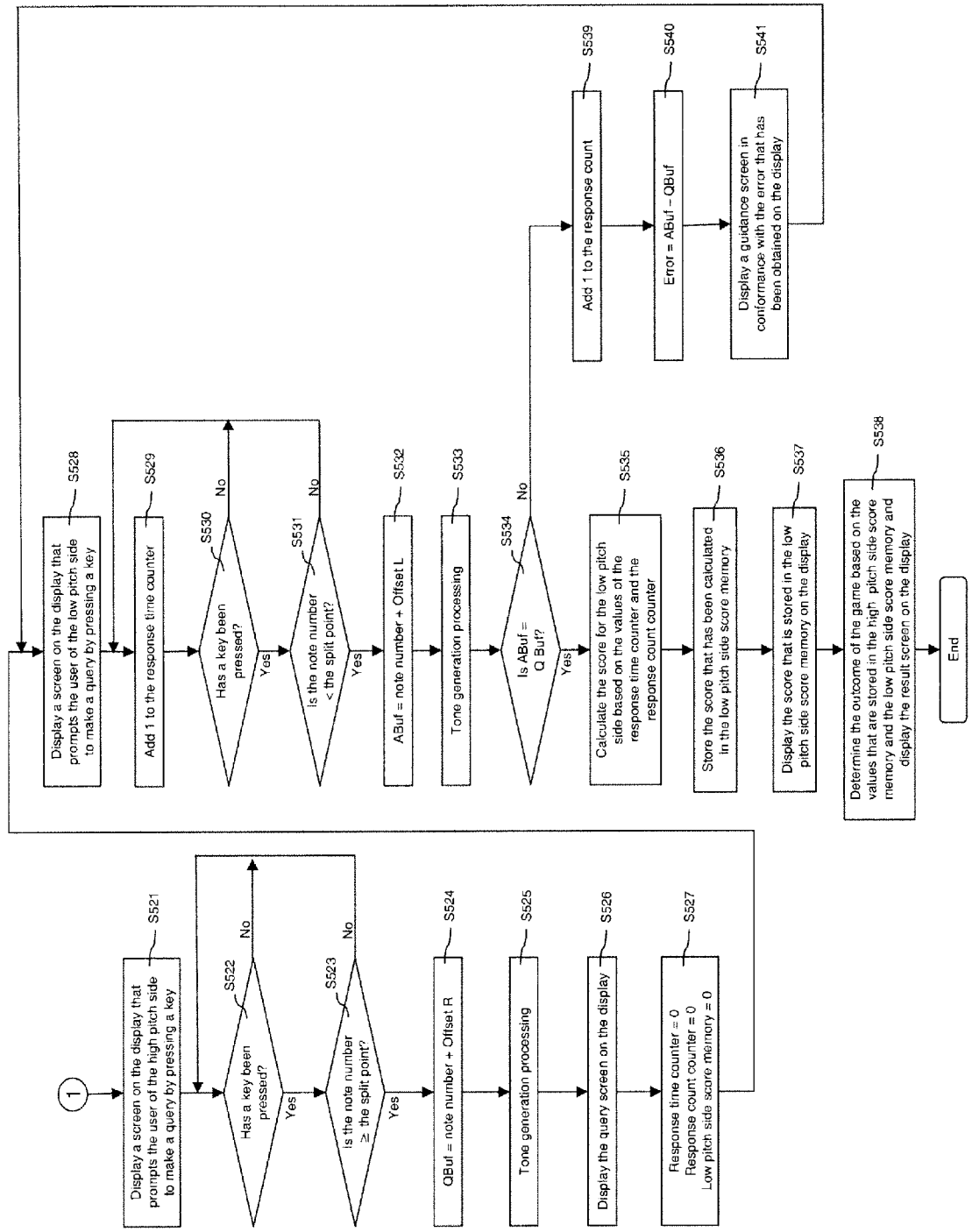
FIG. 6 is a flowchart that shows a piano game process.
Figure 7:
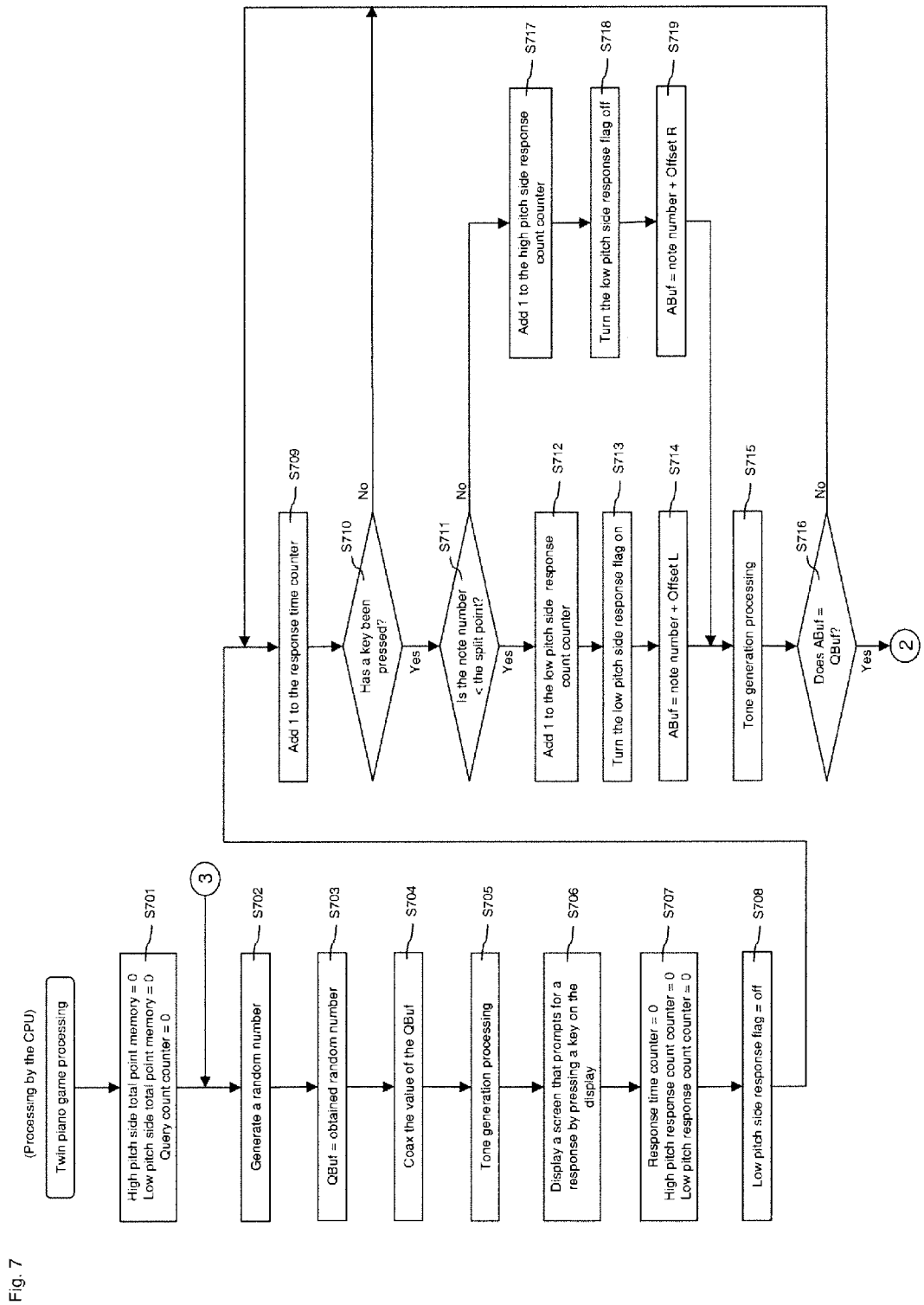
FIG. 7 is a flowchart that shows a piano game process of a second embodiment.

The RAM 4 can be configured with a rewritable memory for the temporary storage of various types of data for the execution of the control programs that can be stored in the ROM 3 or other memory storage. Various types of counters can also be stored in RAM 4, such as, but not limited to the response time counter that is used upon the execution of a twin piano game that will be discussed later (FIG. 6 and FIG. 7). Various types of memory, such as the high pitch side score memory and the like, can also be stored in the RAM 4.

The keyboard 5 has a plurality of white keys and black keys and the pitch as well as the key pressing speed and key releasing speed are output in accordance with the key pressing and key releasing by the user.

The operating panel 6 can be arranged in the vicinity of the keyboard 5. The panel 6 allows the user to set the modes and the parameters of the musical tones. The configuration of the operating panel 6, will be discussed later while referring to FIG. 3.

The sound source 7 generates and terminates the musical tones having pitches that conform to the pressed and released keys on keyboard 5 using timbres that have been set. The sound source 7 stores the respective left channel and right channel waveforms of the musical tones having these timbres. Therefore, when a musical tone is generated, the waveforms that have been stored are read out and form the musical tone that has the pitch and the amplitude envelope in accordance to the key pressing speed that are specified by the key.

The sound source 7 outputs a digital musical tone signal that is converted into an analog musical tone signal by the D/A converter 8. The analog musical tone signal is supplied to the amplifier and the musical tone is emitted from the speaker 11.

Next, an explanation will be given regarding the shift table 3a that can be stored in the ROM 3, which was discussed above, while referring to FIG. 2. FIG. 2 is a schematic depiction that shows the configuration of the shift table 3a.

The electronic musical instrument 1 of this embodiment is configured with two modes, a normal mode and a divided mode. The normal mode allows the entire region of the keyboard 5 to be used. Where as the divided mode (a twin piano mode) allows the keyboard 5 to be divided into two regions. The musical instrument 1 can be configured such that it is possible to select either of the modes. The shift table 3a can hold the note shift numbers of the keyboard 5 corresponding to the dividing point (the split point) when the musical instrument 1 is in the divided mode. The shift table 3a is referred when changing the note number of the key that has been pressed in the twin piano game processing that will be discussed below in greater detail in FIGS. 6 and 7.

As is shown in FIG. 2, the shift table 3a stores the OctShift L and OctShift R. OctShift L is the shift value that is added to the note number of the lower key region (the low pitch side) in conformance with the split point. The OctShift R, is the shift value that is added to the upper key region (the high pitch side) in conformance with the split point.

According to shift table 3a, for example, when the split point has been set to C4, the note number of the key that has been pressed is N, and the note number belongs to the lower key region, the note number N is converted to N+12. If however, note number belongs to the upper key region, then the note number N is changed to N−24. Accordingly, in this preferred embodiment, the split point is the lowest key in the upper key region.

Figure 3:
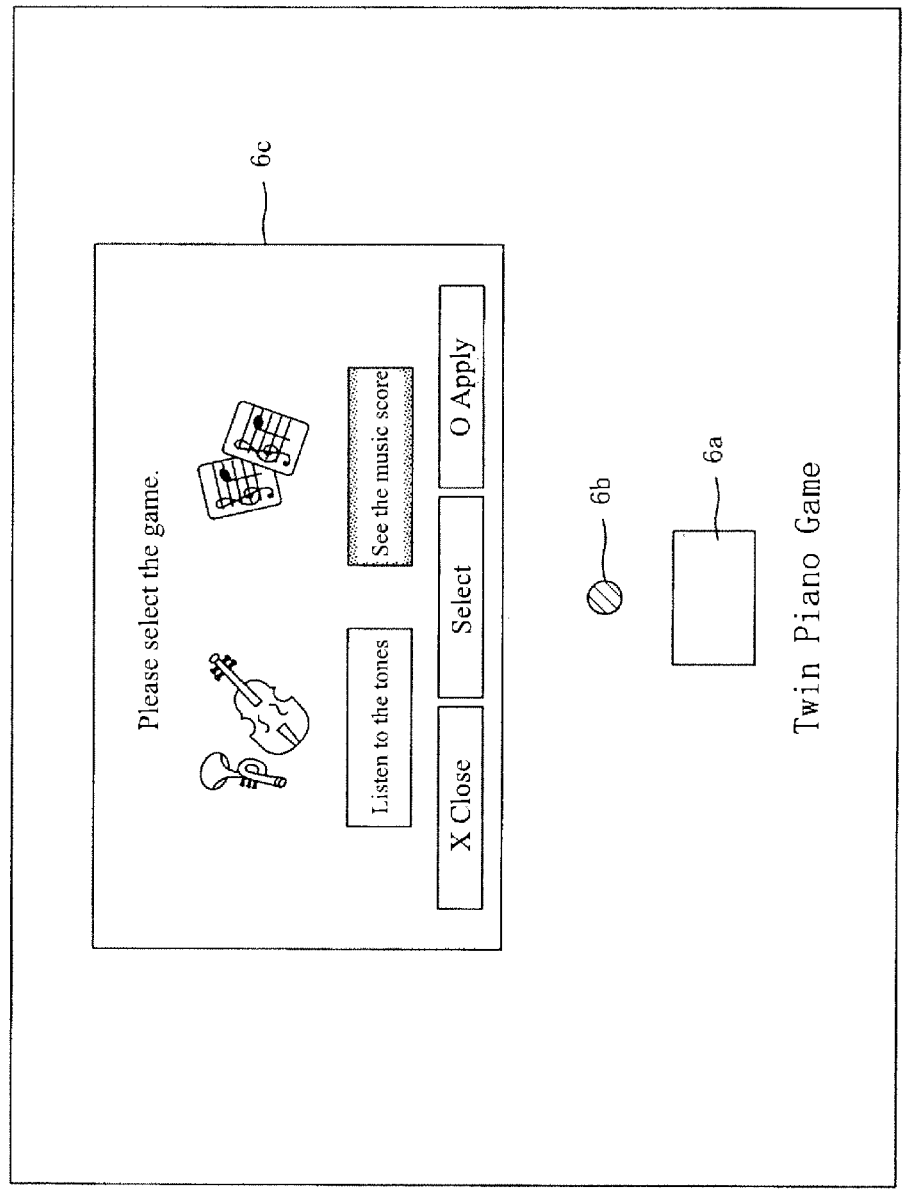
FIG. 3 is a schematic depiction that shows an operating panel.

Next, the operating panel 6 in the electronic musical instrument 1 of this preferred embodiment is demonstrated FIG. 3. FIG. 3 is a schematic depiction that shows the operating panel 6 of the electronic musical instrument 1. As shown in FIG. 3, the operating panel 6 can include a mode change switch 6a, a LED 6b and a display 6c. The mode change switch 6a, toggles between the normal mode and the divided mode. The LED 6b, indicates whether the electronic musical instrument 1 is in the normal mode or in the divided mode.

The mode change switch 6a is a switch that toggles between the normal mode and the divided mode. Specifically, when the mode change switch 6a is switched off, the electronic musical instrument 1 is in the normal mode. When the mode change switch 6a is switched on, the electronic musical instrument 1 is switched to the divided mode.

The current mode of the electronic musical instrument 1 is reported to the user by the lighted state of the LED 6b. Specifically, in those cases where the LED 6b is in the extinguished state, the fact that the electronic musical instrument 1 is set to the normal mode is indicated and when the mode change switch 6a is turned on and the divided mode is switched to, the LED 6b shifts from the extinguished state to the lighted state. In FIG. 3, the case in which the LED 6b is in the lighted state is illustrated by means of hatching.

The display 6c has an LCD screen that includes a pressure sensor and a touch screen display which allow a user to perform operations by pressing a location on the screen. The operation that are performed are in conformance with the details that are displayed at the pressed location. In FIG. 3, the screen is an illustration of a screen in which the twin piano game execution format that is executed in the divided mode is selected.

In the electronic musical instrument 1 of this preferred embodiment, when the mode change switch 6a is turned on and the divided mode (the twin piano mode) is set, the twin piano game is carried out using each of the regions of the keyboard 5. When the game is carried out the keyboard 5 has been divided into two (the twin piano game processing that will be discussed later referring to FIG. 6 and FIG. 7). During the execution of the twin piano game, a screen that corresponds to the progression of the game is displayed on the display 6c.

Figure 4:
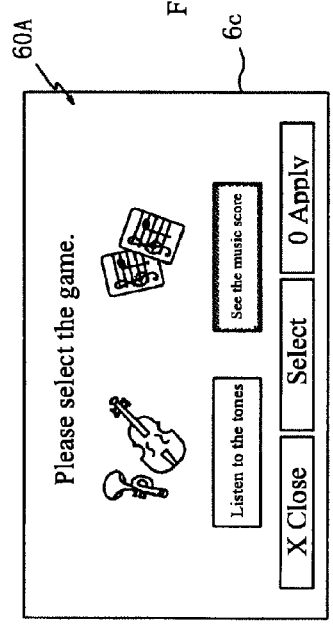
FIG. 4(a) to FIG. 4(e) are schematic depictions of representative screens that are displayed on a display during the execution of a piano game.
Figure 4:
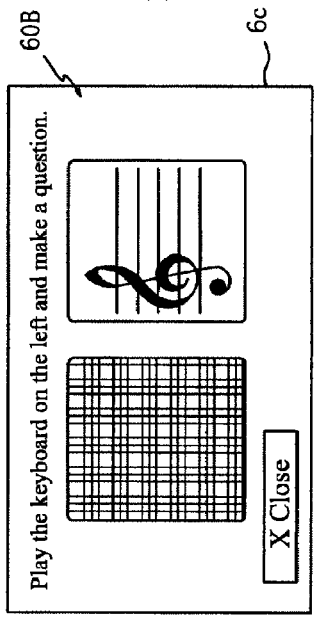
Figure 4:
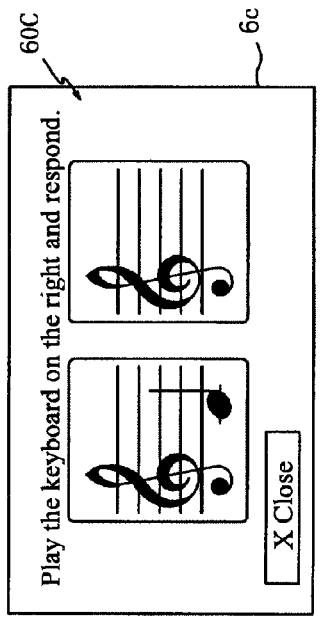
Figure 4:
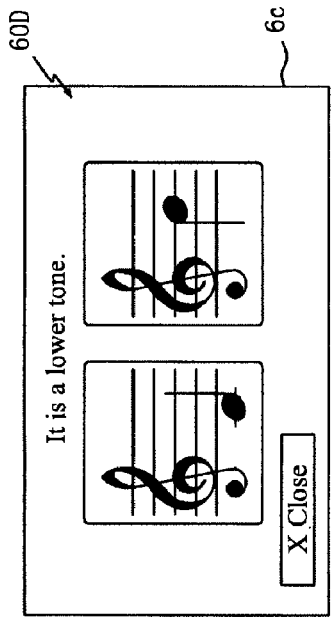
Figure 4:
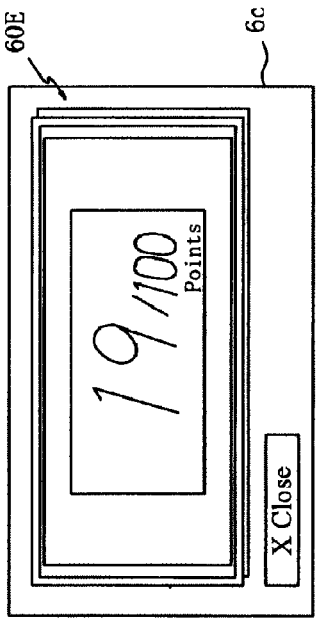

Referring to FIG. 4, an explanation will be given regarding the screens that can be displayed on the display 6c during the execution of the twin piano game. FIG. 4 is a schematic depiction of representative screens that can be displayed on the display 6c during the execution of the twin piano game.

FIG. 4(a) is the screen that is illustrated in FIG. 3, and the drawing shows the screen 60A that selects the execution format for the twin piano game that is executed in the divided mode. The screen 60A allows a user to select the format of the twin piano game; selecting between "listen to the tones" and "see the music score."

Specifically, a "select" button is positioned in the lower center of the screen 60A. "See the music score" and "listen to the tones" is written on top of the screen 60A. Each time the user touches the "select" button, with a finger, the area in which "listen to the tones" has been written and the area in which "see the music score" has been written, which is positioned on the top, are alternately placed in an inverted state. Incidentally, in FIG. 4(a), the screen of the case in which the area in which "see the music score" is written is in an inverted state is illustrated.

Next, the "O Apply" button is positioned on the lower right side of the screen 60A. When the user touches the "O Apply" button, in the state in which the area in which the desired execution format is written is in an inverted state, the relevant execution format that is in the inverted state is selected.

In one preferred embodiment, the electronic musical instrument 1 is configured such that when "listen to the tones" has been selected, after the start of the twin piano game, a query is made by means of a generated tone. On the other hand, in those cases where "see the music score" has been selected, a query is made by means of a music score that was displayed on the display 6c.

FIG. 4(b) shows the screen 60B that prompts either the user who operates the high pitch side (the upper key region) or the user who operates the low pitch side (the lower key region) in the twin piano game to query a question by pressing a key of the keyboard 5. FIG. 4(b) illustrates, when prompted for the query of a question by the user who operates the low pitch side (the lower key region). As shown in FIG. 4(b), "Play the keyboard on the left and make a question" is displayed in the upper portion of the screen 60B. The user is also prompted for a query on the low pitch side by the distinctive pattern that is displayed in the window on the left side, which is the low pitch side, of the roughly square windows that are positioned on both sides of the screen.

FIG. 4(c) illustrates a screen 60C that displays a prompt, for a response from the user, who is positioned on the opposite side of the user who was prompted for a query on the screen 60B. FIG. 4(c) also illustrates a prompt for a response by the user who operates the high pitch side (the upper key region). FIG. 4(c) also displays "Play the keyboard on the right and respond," on the upper portion of the screen 60C. The question that has been queried by the user on the low pitch side is displayed in the window on the low pitch side. The user on the high pitch side is prompted to respond by the display of a musical staff notation in the window on the right, which is the high pitch side. Incidentally, FIG. 4(c) is a display shown when the user has selected "see the music score" by means of the screen 60A that has been described above. However, if "listen to the tones" has been selected, only the display of "Play the keyboard on the right and respond," is performed, and the question is not displayed as the music score in the window for the left side.

FIG. 4(d) illustrates a screen 60D that is displayed when a response has been made by the user on the response side by pressing a key on the keyboard 5 and where the response is incorrect. As is shown in FIG. 4(d), the question that has been queried by the user on the low pitch side is displayed in the window for the low pitch side. The response of the user of the high pitch side can be displayed, in this embodiment, in the window on the right side, also known as the high pitch side. Guidance for navigation to the correct response can be displayed in the upper portion of the screen. FIG. 4(d) also displays guidance, such as but not limited to, since "si," that was given as a response is higher than the "do" that was given as a query, the guidance, "It is a lower tone," can be displayed on the upper portion of the screen as illustrated. FIG. 4(d) is a display shown when the user has selected "see the music score" by means of the screen 60A that has been described above. Likewise, when "listen to the tones" has been selected, only the guidance, "It is a lower tone," is displayed and the question is not displayed as the music score in the window for the left side.

FIG. 4(e) is a drawing that shows the screen 60E that displays the score when the response of the user on the response side was correct. As is shown in FIG. 4(e), in the case where the response by the user of the response side was correct, the score that has been obtained by means of a specified grading method can be displayed in the center of the screen or any other portion of the screen as a performance score.

Figure 5:
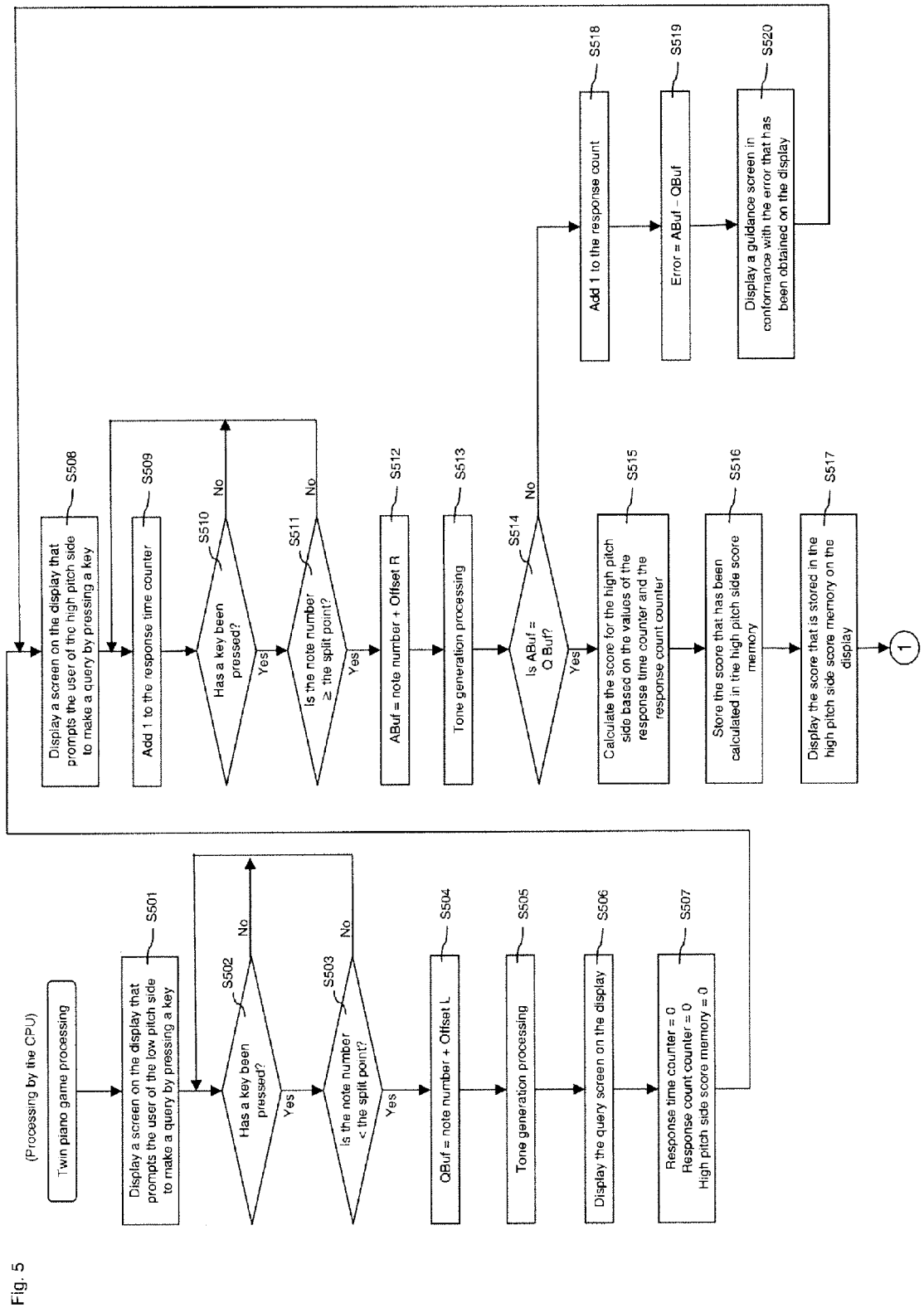
FIG. 5 is a flowchart that shows a piano game process.

Next, an explanation of the twin piano game processing that is executed by the electronic musical instrument 1 that has been configured as discussed above while referring to FIG. 5 and FIG. 6. FIG. 5 and FIG. 6 are flowcharts that show the twin piano game processing that is executed by the CPU 2 of the electronic musical instrument 1.

The twin piano processing is processing that is launched when the user selects either the area in which "listen to the tones" is written in the screen 60A (refer to FIG. 4(a)) that has been displayed on the display 6c or the area in which "see the music score" is written after the mode change switch 6a has been turned on.

As is shown in FIG. 5, in the twin piano processing, first, a screen that prompts for a query by pressing a key is displayed on the display 6c (S501) for the user of the key region side (in this preferred embodiment, the low pitch side) that is set in advance as the one who queries first. The result of the processing of S501, the screen 60B (refer to FIG. 4(b)), is displayed on the display 6c.

After the processing of S501, whether or not a key has been pressed is ascertained (S502) and if a key has not been pressed (S502: no), the processing of S502 is executed again. The execution of the processing of S503 is on stands by until a key is pressed.

When the result that has been ascertained by the processing of S502 is that a key has been pressed (S502: yes), it is ascertained whether the note number of the key that has been pressed is less than the split point (note number<split point), or whether the key that has been pressed is one of the keys of the low pitch side (the lower key region) (S503). If it is determined by the processing of S503 that the key that has been pressed is not one of the keys of the low pitch side (S503: no), the routine returns to S502 because an invalid key has been pressed and waits for a key to be pressed again.

On the other hand, if it is determined by the processing of S503 that the key that has been pressed is one of the keys of the low pitch side (S503; yes), the value in which OctShift L has been added to the note number is made the variable QBuf (S504). The generation of a tone that has the pitch that corresponds to the variable QBuf is performed in the tone generation processing (S505), and the query screen (not shown in the drawing) can be displayed on the display 6c (S506). Next, the processing of S506 is executed when the user has selected "see the music score" as the execution format from the screen 60A (refer to FIG. 4(c)) and the pitch that corresponds to the variable QBuf is displayed as a note on the music score in the window that has been displayed on the left side of the screen. On the other hand, when "listen to the tones" has been selected as the execution format, the processing of S506 is skipped.

After the processing of S506, the response time counter, the response count counter, and the high pitch side score memory that can be stored in the RAM 4 (none of these are shown in the drawing) are initialized to 0 (S507). A screen is displayed on display 6c, that prompts the user of the key region side (in this preferred embodiment, the high pitch side)

that has been set in advance as the first responder side to respond by the pressing of a key (S508). When the twin piano execution format is set to "see the music score," the result of the processing of S508, for example, the screen 60C (refer to FIG. 4(c)), is displayed on the display 6c.

After the processing of S508, 1 is added to the response time counter (not shown in the drawing) (S509) and whether a key has been pressed is ascertained (S510). When a key has not been pressed (S510: no), the routine returns again to S509, and until a key is pressed, successive additions continue to be made to the response time counter and the execution of the processing of S511 stands by.

If the processing of S510 determines that a key has been pressed (S510: yes), then whether the note number of the key that has been pressed is at the split point or above (note number≧split point), in other words, whether the key that has been pressed is one of the keys of the high pitch side (the upper key region) is ascertained (S511). In those cases where the result that has been ascertained by the processing of S511 is that the key that has been pressed is not one of the keys of the high pitch side (S511: no), since this is an invalid key pressing, the routine returns to S509 and again stands by for a key pressing while successive additions continue to be made to the response time counter.

On the other hand, if the processing of S511 determines that the key that has been pressed is one of the keys of the high pitch side (S511; yes), the value to which OctShift R has been added to the note number is stored in variable ABuf (S512). The generation of a tone that has the pitch corresponding to the variable ABuf is played by the tone generation processing (S513). The variable Qbuf is determined at the processing of S504. Processing of S514 determines whether the variable ABuf is equal to the variable QBuf, in other words, whether the pitch that has been responded to is equal to the pitch that was queried, is ascertained (S514).

The processing of S514 determines whether the pitch that has been queried and the pitch that has been responded are not equal. In other words, if the response by the responder was in error (S514: no), then 1 is added to the response count counter (not shown in the drawing) (S518). The error difference between the pitch that has been queried and the pitch that has been responded is acquired (S519), a guidance screen that corresponds to the error that has been obtained is displayed on the display 6c (S520), and the routine shifts to the processing of S508. If "see the music score" is the twin piano execution format, the result of the processing of S520, for example, the screen 60D (refer to FIG. 4(d)) is displayed on the display 6c.

On the other hand, if the result that has been ascertained in the processing of 514 is that the pitch that has been queried and the pitch that has been responded to are equal. In other words, when the response by the responder was correct (S514: yes), a score for the high pitch side is calculated based on the values of the response time counter and the response count counter (S515). A score is calculated based on the values of the response time counter and the response count counter, the score is calculated such that the lower the value of the response time, the higher the score becomes and, in addition, the lower the value of the response count counter, the higher the score becomes.

After the processing of S515, the score that has been calculated is stored in the high pitch side score memory (not shown in the drawing) (S516), the score that is stored in the high pitch side score memory is displayed on the display 6c (S517) and the routine shifts to the processing of S521 (refer to FIG. 6). Incidentally, the result of the processing of S517, for example, a score display screen such as the screen 60E (refer to FIG. 4(e)) is displayed on the display 6c.

In the processing of S521, a screen that prompts for a query by the user of the key region side that is set in advance as the next one to make a query (in this preferred embodiment, the high pitch side) is displayed on the display 6c (S521).

After the processing S521, whether a key has been pressed is ascertained (S522) and if a key has not been pressed (S522: no), the processing of S522 is executed again and the execution of the processing of S523 is on stand by until a key is pressed.

If the result that has been ascertained by the processing of S522 is that a key has been pressed (S522: yes), whether the note number of the key that has been pressed is at the split point or above (note number≧split point), in other words, whether the key that has been pressed is one of the keys of the high pitch side (the upper key region), is ascertained (S523). In those cases where the result that has been ascertained by the processing of S523 is that the key that has been pressed is not one of the keys of the high pitch side (S523: no), since this is an invalid key pressing, the routine returns to S522 and stands by for a key to be pressed again.

On the other hand, if the result that has been ascertained by the processing of S523 is that the key that has been pressed is one of the keys of the high pitch side (S523; yes), the value in which OctShift R has been added to the note number is made the variable QBuf (S524), the generation of a tone that has the pitch that corresponds to the variable QBuf is carried out in the tone generation processing (S525), and the query screen (not shown in the drawing) is displayed on the display 6c (S526). Incidentally, the processing of S526 is processing that is executed in those cases where the user has selected "see the music score" as the execution format from the screen 60A (refer to FIG. 4(c)) and the pitch that corresponds to the variable QBuf is displayed as a note on the music score in the window that has been displayed on the right side of the screen. On the other hand, in those cases where "listen to the tones" has been selected as the execution format, the processing of S526 is skipped.

After the processing of S526, the response time counter, the response count counter, and the low pitch side score memory that can be contained in the RAM 4 (none of these are shown in the drawing) are initialized to 0 (S527). Next a screen that prompts the user of the key region side (in this preferred embodiment, the low pitch side) that has been set in advance as the current responder side to respond by the pressing of a key is displayed on the display 6c (S528). When the twin piano execution format is "see the music score," the result of the processing of S528, for example, the screen that corresponds to the screen 60C (refer to FIG. 4(c)) (a screen in which the contents that are displayed in the window on the left side of the screen and the contents that are displayed in the window on the right side of the screen have been switched), is displayed on the display 6c.

After the processing of S528, 1 is added to the response time counter (not shown in the drawing) (S529) and whether a key has been pressed is ascertained (S530). If a key has not been pressed (S530: no), the routine returns again to S529, and until a key is pressed, successive additions continue to be made to the response time counter and the execution of the processing of S531 is on stands by.

When the result that has been ascertained by the processing of S530 is that a key has been pressed (S530: yes), whether the note number of the key that has been pressed is less than the split point (note number<split point) is ascertained (S531). In other words, whether the key that has been pressed is one of the keys of the low pitch side (the lower key region), is ascertained (S531). When the result that has been ascertained by the processing of S531 is that the key that has been pressed is not one of the keys of the low pitch side (S531: no). Since an invalid key has been pressed, the routine returns to S529 and remains in standby state for a key to be pressed while successive additions continue to be made to the response time counter.

On the other hand, if the result that has been ascertained by the processing of S531 is that the key that has been pressed is one of the keys of the low pitch side (S531; yes), the value in which OctShift L has been added to the note number is stored in the variable ABuf (S532). The generation of a tone that has the pitch that corresponds to the variable ABuf is performed in the tone generation processing (S533). It is also determined whether the variable ABuf is equal to the variable QBuf by the processing of S524. In other words, whether the pitch that has been responded is equal to the pitch that was queried is ascertained (S534).

If the result that has been ascertained by the processing of S534 is that the pitch that has been queried and the pitch that has been responded are not equal, in other words, in those cases where the response by the responder was in error (S534: no), 1 is added to the response count counter (not shown in the drawing) (S539), the error difference between the pitch that has been queried and the pitch that has been responded is acquired (S540), a guidance screen that corresponds to the error that has been obtained is displayed on the display 6c (S541), and the routine shifts to the processing of S538.

In those cases where "see the music score" is the twin piano execution format, the result of the processing of S541, for example, the screen 60D (refer to FIG. 4(d)) (a screen in which the contents that are displayed in the window on the left side of the screen and the contents that are displayed in the window on the right side of the screen have been switched) is displayed on the display 6c.

On the other hand, the processing of 534 determines if the pitch that has been queried and the pitch that has been responded are equal. In other words, the response by the responder was correct (S534: yes), by means of the same grading format as in S515, a score for the low pitch side is calculated based on the values of the response time counter and the response count counter (S535).

After the processing of S535, the score that has been calculated can be stored in the low pitch side score memory (not shown in the drawing) (S536). The score that is stored in the low pitch side score memory can be displayed on a score display screen such as the screen 60E (refer to FIG. 4(e)) on the display 6c (S537).

After the processing of S537, the outcome of the game is determined based on the values that are stored in the high pitch score memory and the low pitch score memory. The result screen (not shown in the drawing) displays the results on the display 6c (S538), and the twin piano game processing ends.

In accordance with the electronic musical instrument 1 of the first preferred embodiment the key region is selected. When the twin piano game processing is executed by having switching to the divided mode by turning the mode change switch on, one of the key regions in the keyboard 5 that has been divided into a high pitch side (the upper key region) and a low pitch side (the lower key region) is selected as the key region of the query side. The pitch in accordance with the key that is pressed in the key region that has been selected is made the query using both the generated tone and the note display or only the generated tone.

After the pitch has been queried and a key has been pressed in a key region that is different from the query side (the high pitch side if the query is in the low pitch side) as the response, it is determined whether the pitch of the key that has been pressed as the response and the pitch that has been queried are equal. In other words, whether the response is correct, is evaluated and when it has been evaluated that the response is correct, a score (the performance result) is displayed in conformance with the response time and the response count.

In addition, when it has been evaluated that the response is correct, by realizing that the key region that is different from the key region that made the query is selected as the key region of the query side, a key of the relevant key region that has been selected is pressed and a key is pressed in the key region that is different from the query side for the pressed key, and a score that corresponds to the response time and the response count is displayed. Then, the score for the side that responded first and the score for the side that responded later (the score for the high pitch side and the score for the low pitch side) are compared and the outcome of the game is determined.

Therefore, in accordance with the twin piano game that is executed by the electronic musical instrument 1 of the first preferred embodiment, it is possible to conduct the training of tone discrimination and music reading with the feeling of a game and thus, the interest of the one who is learning can be maintained. Accordingly, it is possible to study while mutually learning from each other by means of a competitive spirit. As a result, the training of tone discrimination and music reading can be conducted in a more effective manner than previously possible.

In addition, since the score (the performance grade) that is given at the time of a correct response is determined based on the time from the query until the response is obtained, it is effective for training. The reason is that it is possible to perform a quick response in accordance with the tone discrimination or the music reading. In the same manner, since the score (the performance grade) that is given at the time of a correct response is also dependent on the response count from the query until a correct response is obtained, it is possible for the game and the training to be played with a feeling of strain such that erroneous responses are not given.

In addition, when the response is in error, the use of a guidance screen further enhances the learning experience. The guidance screen (for example, the screen 60D (refer to FIG. 4(d)), guides based on the amount of difference between the correct response and the erroneous response, it is possible for the responder to further increase the quality of his or her own tone discrimination or music reading ability by using the guidance screen.

The electronic musical instrument 1 of this preferred embodiment has been configured such that the keyboard 5 is divided into a high pitch side (the upper key region) and a low pitch side (the lower key region) with the split point as the boundary by the turning on of the mode change switch 6a but it is configured with the possibility to appropriately change the relevant split point.

Specifically, when the mode change switch 6a is turned on, first, a screen (not shown in the drawing) that prompts the user to press a key is displayed. Then a screen (not shown in the drawing) that indicates the pressed key is displayed on the display 6c and the key of the keyboard 5 that the user has pressed is set as the split point in accordance with the indication. Incidentally, in this preferred embodiment the split point is the lowest key of the upper key region. For example, in those cases where the key having the pitch C4 has been pressed, C4 is set as the split point, from the lowest key up to B4 is set as the lower key region, and from C4 up to the highest key is set as the upper key region.

In this preferred embodiment, when the split point is set as discussed above, the name of the mode that has been set and the split point are displayed on the display 6c. Next, the screen 60A (refer to FIG. 4(a)) is displayed on the display 6c and the twin piano game processing (FIG. 5 and FIG. 6) that has been discussed above, which is selected as the execution format by the user, is executed. At that time, the shift values (the shift value (OctShiftL) used to shift the note number of a pressed key in the low pitch side (the lower key region) in processes S504 and S532, and the shift value (OctShiftR) used to shift the note number of a pressed key in the high pitch side (the upper key region) in processes S512 and S524) that correspond to the split point that has been set are acquired by referring to the shift table 3a.

Next, an explanation will be given regarding a second preferred embodiment of the electronic musical instrument 1 while referring to FIG. 7 and FIG. 8. With the electronic musical instrument 1 of the second preferred embodiment, the particulars of the twin piano game processing are different from those of the first preferred embodiment discussed above, but the rest of the configuration can be similar to that of the first preferred embodiment that has been discussed above. Therefore, for the explanation of the electronic musical instrument 1 of the second preferred embodiment, the explanation is given using the same key numbers assigned to the those portions that are identical to those of the first preferred embodiment discussed above.

Figure 8:
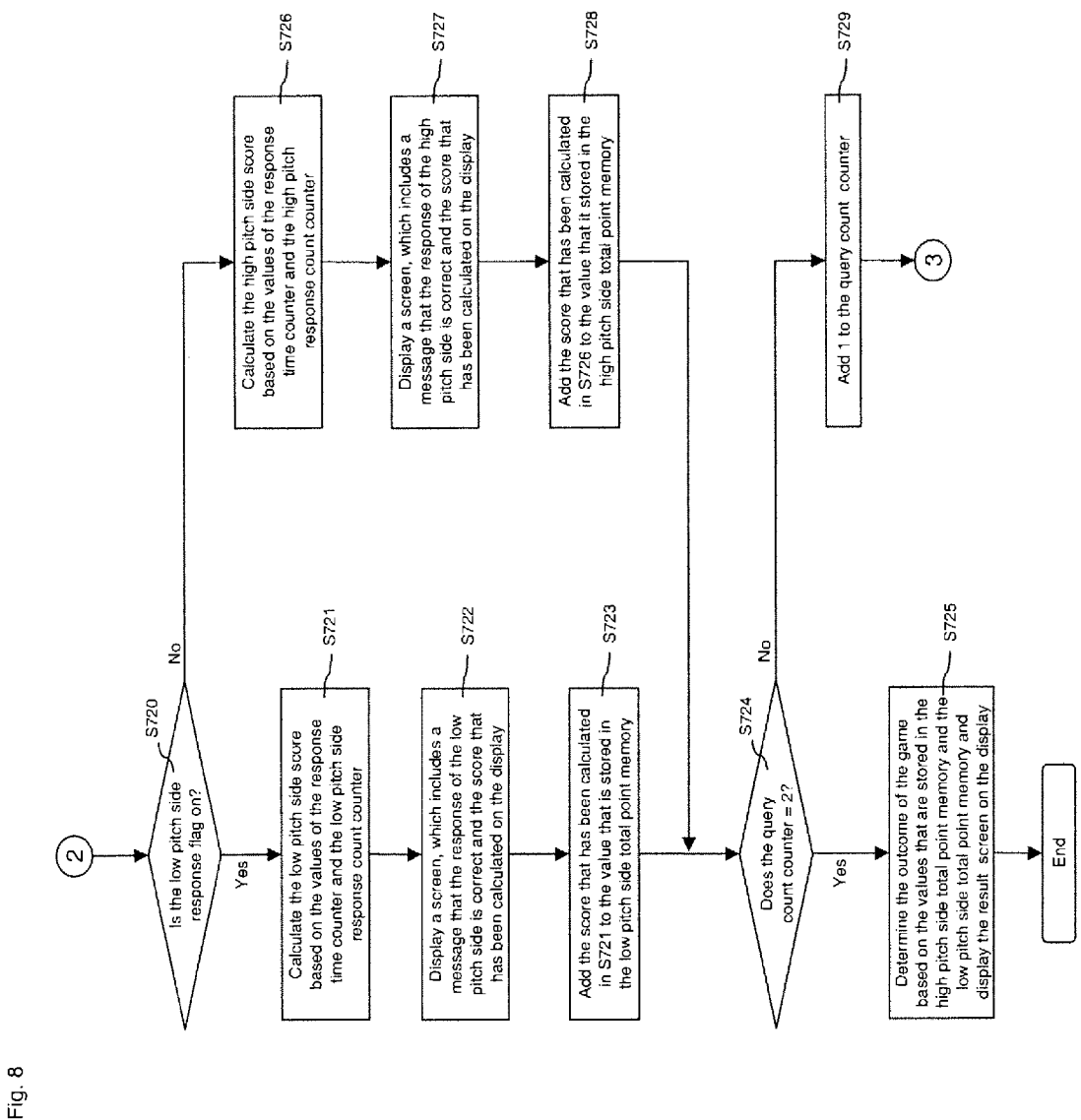
FIG. 8 is a flowchart that shows a piano game process of the second embodiment.

FIG. 7 and FIG. 8 are flowcharts that show the twin piano game processing that is executed by the CPU 2 of the electronic musical instrument 1 of the second preferred embodiment. The twin piano game processing of the second preferred embodiment can be, launched after the mode change switch 6a has been turned on and the user has selected either the area in which "listen to the tones" is written or the area in which "see the music score" is written on the screen 60A (refer to FIG. 4(a)) that has been displayed on the display 6c.

As is shown in FIG. 7, in the twin piano game processing of the second preferred embodiment, first, the high pitch side total point counter, the low pitch side total point counter, and the query count counter (none of which are shown in the drawing), which are stored in the RAM 4, are initialized to 0 (S701). A random number is generated (S702), and the random number that has been generated is made the variable QBuf (S703).

After the processing of S703, the value of the variable QBuf is limited such that the value comes into the range in which tone generation by the low pitch side and the high pitch side is possible (S704), and the generation of a tone having a pitch that corresponds to the variable QBuf is carried out in the tone generation processing (S705). In other words, in the twin piano game processing of this preferred embodiment, the electronic musical instrument 1 becomes the one that queries.

After the processing of S705, a screen (not shown in the drawing) that prompts the user for a response by the pressing of a key, is displayed on the display 6c (S706). When the twin piano execution format is "see the music score," on the screen that is displayed as the result of the processing of S706, the musical score in which the pitch that has been queried is entered as a musical notation is contained.

After the processing of S706, the response time counter, the high pitch response count counter, and the low pitch response count counter (none of which are shown in the drawing), which can be stored in the RAM 4, are initialized to 0 (S707). Next, the low pitch side response flag (not shown in the drawing) that is disposed in the RAM 4 is initialized to off (S708).

After the processing of S708, 1 is added to the response time counter (not shown in the drawing) (S709), whether a key has been pressed is ascertained (S710). If a key has not been pressed (S710: no), the routine returns to S709 again and until a key is pressed, the execution of the processing of S711 remains on stand by. While on stand by successive additions continue to be made to the response time counter.

The processing of S710 determines whether a key has been pressed (S710: yes). Next, the processing of S711 determines if the note number of the key that has been pressed is less than the split point (note number<split point) (S711).

If the processing of S711 determines that the note number of the pressed key is less than the split point, in other words, the key that has been pressed is one of the keys of the low pitch side (S711: yes), 1 is added to the low pitch side response count counter (not shown in the drawing) (S712). Next, the low pitch side response flag (not shown in the drawing) is turned on (S713), and the value in which OctShift L has been added to the note number is made the variable ABuf (S714).

After the processing of S714, the tone having a pitch corresponding to variable ABuf is generated by the tone generation processing (S715). Next, it is determined whether the variable ABuf and the variable QBuf, which has been obtained as the result of the processing of S704 are equal. In other words, it is determined whether the pitch that has been queried and the pitch that has been responded are equal (S716).

If the processing of S716 determines that the pitch that has been queried and the pitch that has been responded are not equal, meaning, the response by the responder was erroneous (S716: no), then the routine shifts to the processing of S709 and stands by for the next key to be pressed (the next response). While S709 is on stand by successive additions continue to be made to the response time counter.

In addition, when the result that has been ascertained by the processing of S711 is that the note number of the pressed key is at or above the split point, in other words, the key that has been pressed is one of the keys on the high pitch side (S711: no), 1 is added to the high pitch side response counter (not shown in the drawing (S717). The low pitch side response flag (not shown in the drawing) is turned off (S718), and the value in which OctShift R has been added to the note number is stored in the variable ABuf (S719).

After the processing of S719, the routine shifts to the processing of S715. Therefore, until the pitch that has been queried and the pitch that has been responded are equal, in other words, until the response by the responder is correct, the processing of S709 through S719 is repeated. The time until a correct response is obtained and the response count until a correct response is obtained are respectively totaled by the response time counter and the low pitch side response count counter and high pitch side response count counter.

In addition, the result that has been determined by the processing of S716 is that the pitch that has been queried and the pitch that has been responded are equal (S716: yes), the routine shifts to the processing of S720 (refer to FIG. 8) and whether the low pitch side response flag is on is determined (S720).

If the processing of S720 determines is that the low pitch side response flag is on, in other words, that the correct response has been obtained from the user of the low pitch side (S720: yes), the score for the low pitch side is calculated based on the values of the response time counter and the low pitch side response count counter (S721). When the score is calculated based on the values of the response time counter and the low pitch side response count counter, the score is calculated such that the lower the value of the response time, the higher the score becomes and, in addition, the lower the value of the low pitch side response count counter, the higher the score becomes.

After the processing of S721, a screen (not shown in the drawing), which includes a message that the response of the low pitch side is correct and the score that has been calculated is displayed on the display 6c (S722), the score that has been calculated in S721 is added to the value that is stored in the low pitch side total point memory (not shown in the drawing) (S723), and the routine shifts to the processing of S724.

On the other hand, if the result that has been obtained by the processing of S720 is that the low pitch side response flag is not on, in other words, that the correct response has been received from the user of the high pitch side (S720: no), the score for the high pitch side is calculated using the same grading method as in S721 based on the values of the response time counter and the high pitch side response count counter (S726).

After the processing of S736, a screen (not shown in the drawing), which includes a message that the response of the high pitch side is correct and the score that has been calculated is displayed on the display 6c (S727). The score that has been calculated in S726 is added to the value that is stored in the high pitch side total point memory (not shown in the drawing)(S728), and the routine shifts to the processing of S724.

In the processing of S724, whether the query count counter (not shown in the drawing) is 2 is ascertained (S724). If the result that has been ascertained by the processing of S724 is that the query count counter is not 2 (S724: no), 1 is added to the query count counter (S729), the routine shifts to the processing of S702 (refer to FIG. 7), and the nth query (n=2 or 3) is made.

On the other hand, if the processing of S724 determines that the query count counter is 2 (S724: yes), since the end is set for three queries and responses, the outcome of the game is determined. This outcome is based on the values that are stored in the high pitch side total point memory, the low pitch side total memory. The results screen displays the result (not shown in the drawing) on the display 6c (S725), and the twin piano game processing ends.

As explained above, the electronic musical instrument 1 of the second preferred embodiment, in the divided mode (the twin piano game), after the query of the pitch has been made a generated tone and displayed as musical notation or just generated as a tone, there is a competition to obtain a correct response. The competition is won by the user with the earlier response from either of the key regions between the two key regions that have been obtained by the division of the keyboard 5. The two key regions of the high pitch side (the upper key region) and the low pitch side (the lower key region) and the key region in which the earlier correct response has been obtained is reported by the display on the display 6c.

In this manner, the electronic musical instrument 1 of the second preferred embodiment, by means of the competition in the swiftness in obtaining a correct response after the query to each of the responders, it is possible to conduct the training of tone discrimination and music reading with the feeling of a game and the interest of the one who is learning can be maintained. Accordingly, it is possible to study while mutually learning from each other by means of a competitive spirit. As a result, the training of tone discrimination and music reading can be done effectively.

In addition, rather than only determining the outcome of the game for each single query, by determining the final outcome from the total points for a multiple number of queries, it is possible to further raise the nature of the game and reliably maintain the interest of those who are training.

Next, an explanation will be given regarding a third preferred embodiment of the electronic musical instrument 1. In the third preferred embodiment, the particulars of the twin piano game processing differ from those of the first and second preferred embodiments discussed above. However, most of the configuration is identical to that of the first and second preferred embodiments that have been discussed above. Therefore, for the explanation of the electronic musical instrument 1 of the third preferred embodiment, the explanation is given with the same key numbers assigned to the those portions that are similar to those of the first and second preferred embodiments discussed above.

The twin piano game processing that is executed by the CPU 2 of the electronic musical instrument 1 of the third preferred embodiment includes one of the key regions of the high pitch side (the upper key region) or the low pitch side (the lower key region) of the keyboard 5 is selected as the key region for the response side. The response is made to a question that is queried by the electronic musical instrument 1. After a correct response has been obtained, the other key region is selected as the key region for the response side and a response is made to another question that is queried by the electronic musical instrument 1.

For the specific processing, the processing of S501 through S506 and the processing of S521 through S526 related to the query in the twin piano game processing that is executed by the electronic musical instrument 1 of the first preferred embodiment (FIG. 5 and FIG. 6) may be replaced by the processing of S701 through S705 related to the query in the twin piano game processing that is executed by the electronic musical instrument 1 of the second preferred embodiment (FIG. 7 and FIG. 8).

Therefore, in accordance with the electronic musical instrument 1 of the third preferred embodiment, the query of the pitch by the electronic musical instrument 1 is both a generated tone and displayed as musical notation or just generated as a tone in the divided mode (the twin piano game).

On the other hand, when one of the key regions is selected as the key region of the response side in the keyboard 5 and a key has been pressed as a response in the key region, whether the pitch of the key that has been pressed as the response and the pitch of the query are in agreement is determined. In other words, whether the response is correct is evaluated, and if the response is correct, the score (the performance grade) that corresponds to the response time and the response count is displayed.

In addition, when the response is correct, the key region that is different from the key region that responded before is selected as the key region of the response side. Next, a query by the electronic musical instrument 1 and in response a key is pressed in the key region of the response side. Next it is determined whether the response is correct, the score that corresponds to the response time and the response count is displayed. Then, the score for the side that responded before and the score for the side that responded afterward (the score for the high pitch side and the score for the low pitch side) are compared and the outcome of the game is determined.

In this manner, in accordance with the twin piano game that is executed by the electronic musical instrument 1 of the third preferred embodiment, it is possible to conduct the training. The means of the appropriate alternation of the response sides in the key regions that have been divided, makes it possible to conduct the training of tone discrimination and music reading with the feeling of a game and the interest of the one who is learning can be maintained. Accordingly, it is possible to study while mutually learning from each other by means of a competitive spirit. As a result, the training of tone discrimination and music reading can be done effectively.

Here, when the value of the variable QBuf is calculated (the step that corresponds to S704) and when the query is made to the low pitch side, the calculation is performed such that the value is in the entire key range of the low pitch side (the lower key range) in which tone generation is possible. On the other hand, if query is to the high pitch side, the value is calculated in such a manner that the value is in the entire key range of the high pitch side (the upper key region) in which tone generation is possible.

With the electronic musical instrument 1 of this preferred embodiment, in the same manner as the electronic musical instrument 1 of the first preferred embodiment discussed above, it is possible to set the range in which tone generation is possible in the key region of the low pitch side (all of the keys that are contained in the key region of the low pitch side) using the setting position of the split point. It is also possible to have a range of tone generation in the key region of the high pitch side (all of the keys that are contained in the key region of the high pitch side) such that they are each different by the setting position of the split point. Accordingly, by setting the split point such that the respective ranges in which tone generation is possible in the key region of the low pitch side and the key region of the high pitch side to be different, it is possible to make the query range for the responder of the low pitch side and the query range for the responder of the high pitch side different.

Therefore, the electronic musical instrument 1 of this preferred embodiment allows the query ranges of each of the key regions that have been divided in conformance with the setting position of the split point differently. The above feature allows the twin piano game to be used for a beginner and an experienced person at the same time. In order to accomplish this the key region for which the range of tone generation is narrow is assigned to the beginner and assigning the key region for which the tone generation range is wide to the experienced person. Likewise, the query range for the beginner can be made narrower than the query range for the experienced person. Furthermore, it is possible to effectively make the training of tone discrimination and music reading in conformance with the users level of experience.

The present invention is not in any way limited to the specific preferred embodiments that has been discussed above, and the possibility of various modifications and changes that do not diverge from and are within the scope of the tenor and purport of the present invention can be easily surmised.

For example, in each of the preferred embodiments described above, have been configured such that the keyboard 5 is divided into the two key regions of the high pitch side (the upper key region) and the low pitch side (the lower key region) and the twin piano game is carried out by a querying entity and a responding entity with respect to one another. However, it may also be configured such that the twin piano game discussed above is carried out using two electronic musical instruments that are connected so that mutual communication is possible. In those cases where the twin piano game is conducted using two electronic musical instruments, it may be configured such that one electronic musical instrument (the first electronic musical instrument) is performed by the first user while the other electronic musical instrument (the second electronic musical instrument) is performed by the second user and they become the querying entity and the responding entity with respect to each other.

Specifically, for example, the note number at the time that the first user, who has become the querying entity, operates the keyboard of the first electronic musical instrument is input to the second electronic musical instrument and is generated as a tone or displayed in musical notation due to the processing by the control system (for example, the CPU) of the relevant second electronic musical instrument. When the relevant query is made, the second user, who has become the responding entity, responds by means of the operation of the keyboard of the second electronic musical instrument. Then, the note number that has been input at the time of the response by means of the operation of the keyboard of the second electronic musical instrument and the note number that has been input first from the first electronic musical instrument as the question are compared. The processing of the control system (for example, the CPU) of the relevant second electronic musical instrument is used for the comparison and in those cases where the evaluation is that the response is correct, the querying entity and the responding entity are switched.

In yet another embodiment the game may be configured such that, for example, when the twin piano game is conducted using two electronic musical instruments that have been connected so that mutual communication is possible, a pitch that has been mechanically generated as a question by the first electronic musical instrument is output simultaneously as a generated tone or a displayed musical notation from both the first electronic musical instrument and the second electronic musical instrument. That allows for a competition with regard to the rapidity of the response is held between the first user who operates the first electronic musical instrument and the second user who operates the second electronic musical instrument.

In addition, it may also be configured such that in those cases where the twin piano game is conducted using two electronic musical instruments that have been connected so that mutual communication is possible, for example, a pitch that has been mechanically generated as a question by the first electronic musical instrument is output as a generated tone or a displayed musical notation to either one of the electronic musical instruments, the first electronic musical instrument or the second electronic musical instrument that has been selected as the response side. In this case, the user who operates the electronic musical instrument on the side to which the output has been made responds and, in those cases where the response has been correct, the side that makes the response is changed to the other electronic musical instrument.

The electronic musical instrument may be configured such that the twin piano game is conducted using the keyboard of one electronic musical instrument and a separate keyboard that has been connected to the relevant electronic musical instrument by means of a MIDI (musical instrument digital interface) and the like. It may be configured such that the twin piano game is conducted by connecting a single keyboard to a computer with a MIDI and the like and dividing the relevant keyboard into two. It may also be configured such that two keyboards are connected to a computer with a MIDI and the like, and the twin piano game is conducted using these two keyboards.

In addition, in the first preferred embodiment described above, it has been configured such that in those cases where after one question has been queried by the query side and a correct response has been made by the response side to the question that has been queried, the key region of the query side and the key region of the response side are automatically switched but the timing of the switching is not limited to this. For example, it may also be configured such that the response side is switched in those cases where after one question has been queried by the query side, before a correct response is made to the question that has been queried, a specified number of erroneous responses have been made. In addition, it may also be configured such that after one question has been queried by the query side, the making of a correct response by the response side to the question that has been queried is recorded in a set and the switching is done in the case where the relevant set reaches a specified number. The musical instrument may also be configured such that after one question has been queried by the query side, the making of a correct response by the response side to the question that has been queried or before a correct response, the making of erroneous responses is recorded in a set and the switching is done when the relevant set has reached a specified number. The number of queries that are possible for the query side to query may be made differently for each of the keyboards that have been divided. Or, it may also be configured such that after one question has been queried by the query side, the switching is done automatically when the fact that a specified period of time has passed has been detected.

In the same manner, with regard to the switching of the response side in the third preferred embodiment described above, it has been configured such that the key region of the query side and the key region of the response side are automatically switched when a correct response has been made by the response side. However, the timing of the switching is not limited to this. For example, it may also be configured in a manner that the automatic switching is done before a correct response is made by the response side, after a specified number of erroneous responses are made. In addition, it may also be configured such that after one question has been queried by the query side, the making of a correct response by the response side to the question that has been queried is recorded in a set and the switching is done in the case where the relevant set reaches a specified number. Or, it may also be configured such that after one question has been queried by the query side, the making of a correct response by the response side to the question that has been queried or before a correct response, the making of erroneous responses is recorded in a set and the switching is done in the case where the relevant set reaches a specified number. The number of queries that it is possible for the response side to be queried by the electronic musical instrument 1 may be made different for each of the keyboards that have been divided. Or, it may also be configured such that after one question has been queried by the query side, the switching is done automatically in the case where the fact that a specified period of time has passed has been detected.

In addition, in the second preferred embodiment described above, it has been configured such that the key region of either of the two key regions of the high pitch side and the low pitch side from which the earlier correct response has been obtained is reported by the display on the display 6c. However, it may also be configured such that in those cases where the outcome of the game is not determined due to the running out of time and the like, that result is reported by the display on the display 6c.

In addition, the second preferred embodiment described above is configured such that rather than just determining the outcome for each single question, the final outcome is determined from the total points for the responses to a plurality of questions. That configuration may also be utilized in any of the preferred embodiments.

In addition, in the first and the third preferred embodiments described above, it is configured such that when the response has been erroneous, a guidance screen is displayed. The guidance screen, in this embodiment, that is based on the amount of the difference between the correct response and the erroneous response is displayed on the display 6c. That configuration may also be utilized in the second preferred embodiment.

In addition, in each of the preferred embodiments described above, they have been set up such that a correct response in the tone guessing game that the pitches are in agreement. However, the game does not have to be limited to this and it may also be configured such that a tone that is only a specified amount lower or higher than the pitch that has been queried (for example, a tone that is one octave lower than the pitch that has been queried or a tone that is a quintuple above the pitch that has been queried) is made the correct response.

In addition, in each of the preferred embodiments described above, the twin piano game that is executed in the divided mode has been configured as a tone guessing game using a single tone. However, it is not limited to this and the game may be configured as a rhythm guessing game in which a single tone is queried with a specified rhythm and the responder also again presses a key with the rhythm that has been queried. In addition, the game may also be configured as a chord guessing game in which a chord that is structured from a plurality of tones based on the keys which have been pressed simultaneously is queried and the responder responds by again pressing the keys of the chord. In addition, the game may be configured as a phrase guessing game, where the phrase contains a plurality of tones, created by keys pressed in succession and the responder responds by performing the phrase in the same succession. The relevant phrase is not limited to one that has been configured such that each tone is a single tonal length and they may also be configured from a variety of tonal lengths.

In addition, each of the preferred embodiments described above has been configured such that in those cases where "see the music score" has been selected as the execution format, the query is made using both a generated tone and a music notation display. However it may also be configured such that in those cases where "see the music score" has been selected, the query is made using only the music notation display.

In addition, in each of the preferred embodiments described above, a query in which the music notation display described above has been used and a query using a tone generation only have been given as illustrations for the query format but in addition to these, a display of the note name or a display of the chord name by means of chord recognition and the like may also be utilized. In addition, it may be configured such that the various types of query formats are each different as required (for example, in conformance with the key region).

Each of the preferred embodiments described above have been configured so that when it has been evaluated that the response is correct, the score is displayed on the display 6 in conformance with the response time and the response count. However the report may can also be by means of an audio output. In addition, the preferred embodiments may also be configured such that the report using a tone can be differentiated regarding which one of the key regions is the winner.

What is claimed is:

1. An electronic musical instrument comprising:
 a plurality of performance operators that are arranged in a performance region;
 divided mode means for designating a divided mode that divides the performance region into a first region and a second region, wherein the second region is different from the first region, and wherein a performance operator of the first region specifies pitch information that is the same as pitch information specified by a performance operator of the second region;

query performance data output means for outputting performance data that includes at least the pitch information that is based on the pitch information of specified by the performance operator of the first region or the performance operator of the second region, when the divided mode means designates the divided mode;

response performance data acquisition means for acquiring response performance data that includes at least the pitch information as specified by the performance operator of the first region or the performance operator of the second region, wherein the data is acquired as the response performance data;

region identification means for identifying whether a performance operator of either the first or the second region has been operated by using the data from the response performance data acquisition means;

condition determination means for determining whether predefined conditions have been satisfied based on the response performance data that has been acquired by the response performance data acquisition means and the region that has been identified by the region identification means; and reporting means for reporting the results of the determination by the condition determination means.

2. The electronic musical instrument of claim 1, wherein one of the predefined conditions is whether the response performance data matches the query performance data a specified number of times.

3. The electronic musical instrument of claim 1, wherein one of the predefined conditions is whether the response performance data does not match the query performance data a specified number of times.

4. The electronic musical instrument of claim 1, wherein one of the predefined conditions is whether a specified amount of time has passed.

5. An electronic musical instrument comprising:

a plurality of performance operators that are arranged in a performance region;

divided mode designation means for designating a divided mode with which the performance region is divided into the first region and the second region that is different from the first region;

region selection means for selecting one of either the first region or the second region as divided by the divided mode designation means;

query performance data output means for outputting query performance data that includes at least the pitch information that is based on the pitch information of the first region or the second region, as selected by the region selection means;

response performance data acquisition means for acquiring the response performance data that includes at least the pitch information that is specified by a performance operator that is in the region selected by the region selection means;

condition determination means for determining whether or not predefined conditions have been satisfied using the response performance data that has been acquired by the response performance data acquisition means and/or the query performance data that have been output by the query performance data output means; and reporting means for reporting the results of the determination by the condition determination means;

wherein the region selection means selects a new region that is different from the region that is currently selected, when the condition determination means determines that the predefined conditions have been satisfied.

6. The electronic musical instrument of claim 5, wherein the predefined condition is whether the response performance data matches the query performance data a specified number of times.

7. The electronic musical instrument of claim 5, wherein the predefined condition is whether the response performance data does not match the query performance data a specified number of times.

8. The electronic musical instrument of claim 5, wherein the predefined condition is whether a specified amount of time has passed.

9. The electronic musical instrument of claim 5, further comprising a query performance data output means for acquiring the query performance data;

the region selection means for selecting the one of the first region or the second region as a region for inputting the query performance data;

the region selection means for selecting the other of the first region or the second region as a region for inputting the response performance data;

the query performance data output means for acquiring the query performance data that includes at least the pitch information that is specified by a performance operator that is in the region for inputting the query performance data;

the response performance data acquisition means for acquiring the response performance data that includes at least the pitch information that is specified by a performance operator that is in the region for inputting the response performance data;

wherein the region selection means selects another region for inputting the query performance data that is different from the region that is currently selected for inputting the query performance data and selects another region for inputting the response performance data that is different from the region that is currently selected for inputting the response performance data, when the condition determination means determines that the predefined conditions have been satisfied.

10. The electronic musical instrument of claim 9, wherein the condition is whether the response performance data matches the query performance data a specified number of times.

11. The electronic musical instrument of claim 9, wherein the condition is whether the response performance data does not match the query performance data a specified number of times.

12. The electronic musical instrument of claim 9, wherein the condition is whether a specified amount of time has passed.

13. A performance control program process comprising:

designating a divided mode in which a specified performance region that contains a plurality of performance operators is divided into a first region and a second region, where the second region is different from the first region and has a performance operator to specify pitch information that is the same as pitch information that is designated by a performance operator of the first region;

outputting query performance data that include at least the pitch information that can be designated by a performance operator that is contained in the first region and/or a performance operator that is contained in the second region in the divided mode;

identifying which of either the first region or the second region has been operated after the query performance data have been output;

acquiring response performance data after the query performance data have been output by the query performance data output step, and the performance operator of the first region or the second region has been operated, wherein the performance data that included at least the pitch information that is specified by the operated performance operator is acquired as response performance data;

determining whether or not predefined conditions have been satisfied based on at least one of the response performance data that have been acquired by the response performance data acquisition step, the query performance data that has been output by the query performance data output step, or the region that has been identified by the region identification step; and reporting the results of the determination of whether or not the predefined conditions are satisfied.

14. A performance control program process comprising:

designating a divided mode with which a specified performance region that contains a plurality of performance operators is divided into a first region and a second region that is different from the first region;

selecting one of either the first region or the second region;

outputting query performance data comprising the performance data that includes at least the pitch information that can correspond to a performance operator that is contained in the selected one of the first and second regions;

acquiring response performance data, wherein after the query performance data have been output and an operator that belongs to the selected region has been operated, performance data that include at least the pitch information that is specified by the operated performance operator is acquired as the response performance data;

determining whether or not predefined conditions are satisfied, based on the acquired response performance data and/or the query performance data; and selecting a new region that is different from the region that is currently selected, when a determination has been made that the predefined conditions have been satisfied;

reporting the results of the step of determining whether or not predefined conditions are satisfied.

* * * * *